Oct. 9, 1956 W. J. WATTS ET AL 2,765,903
LOG FEEDING APPARATUS FOR A DEBARKING MACHINE
Original Filed May 10, 1950 6 Sheets-Sheet 2

Inventors:
WILLIAM J. WATTS and
FRANK B. CADMAN,
by: Martin J. Carroll
their Attorney.

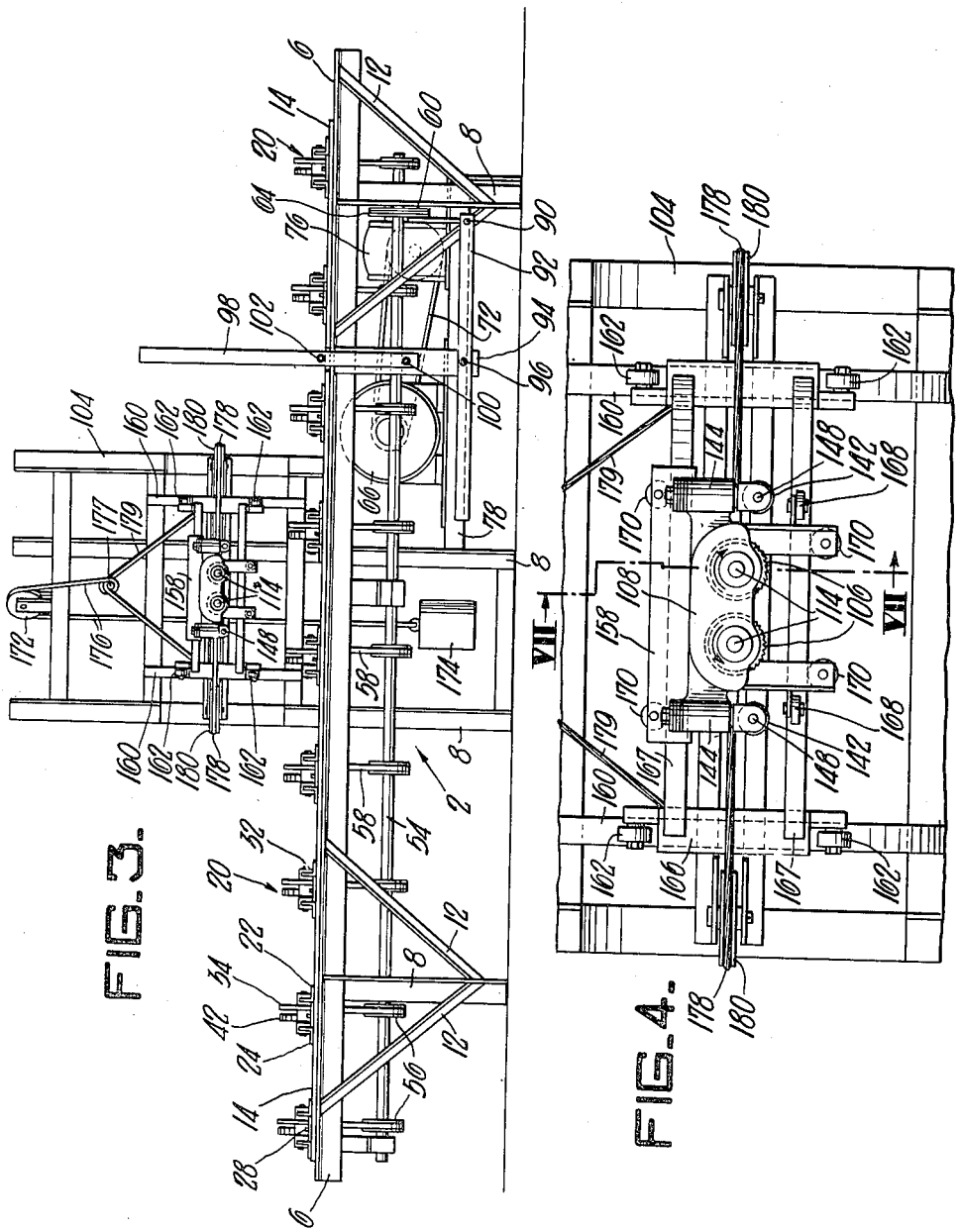

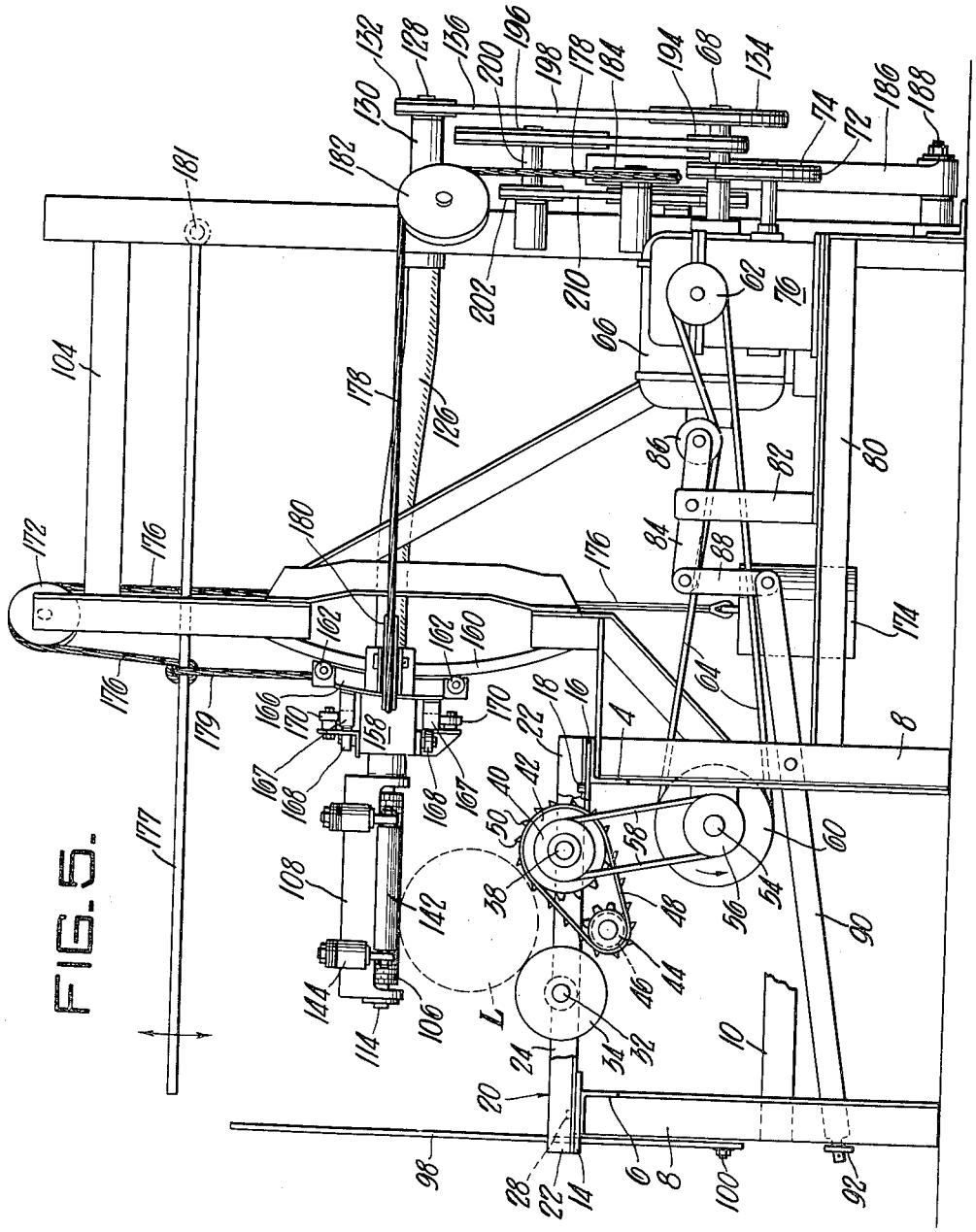

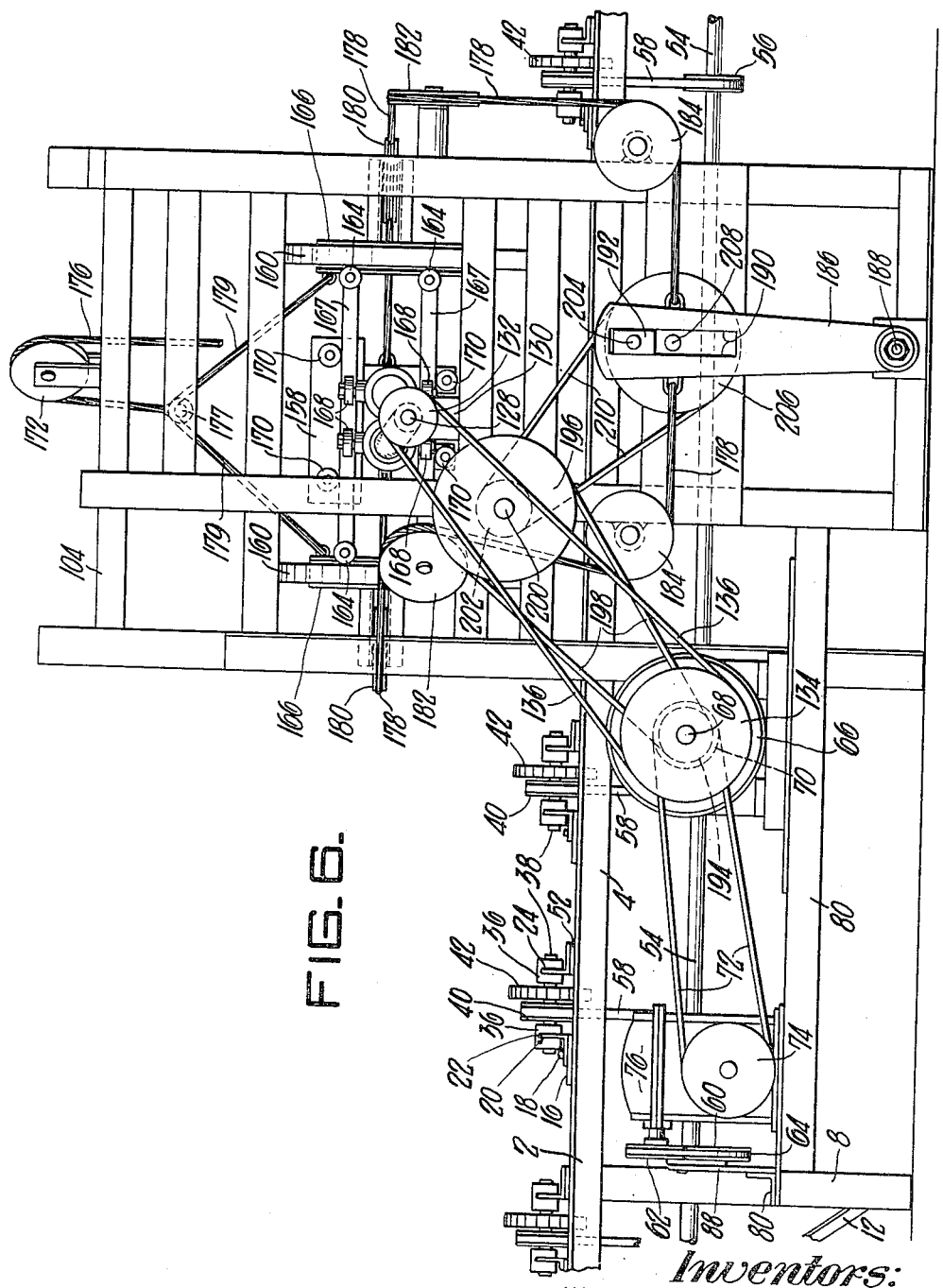

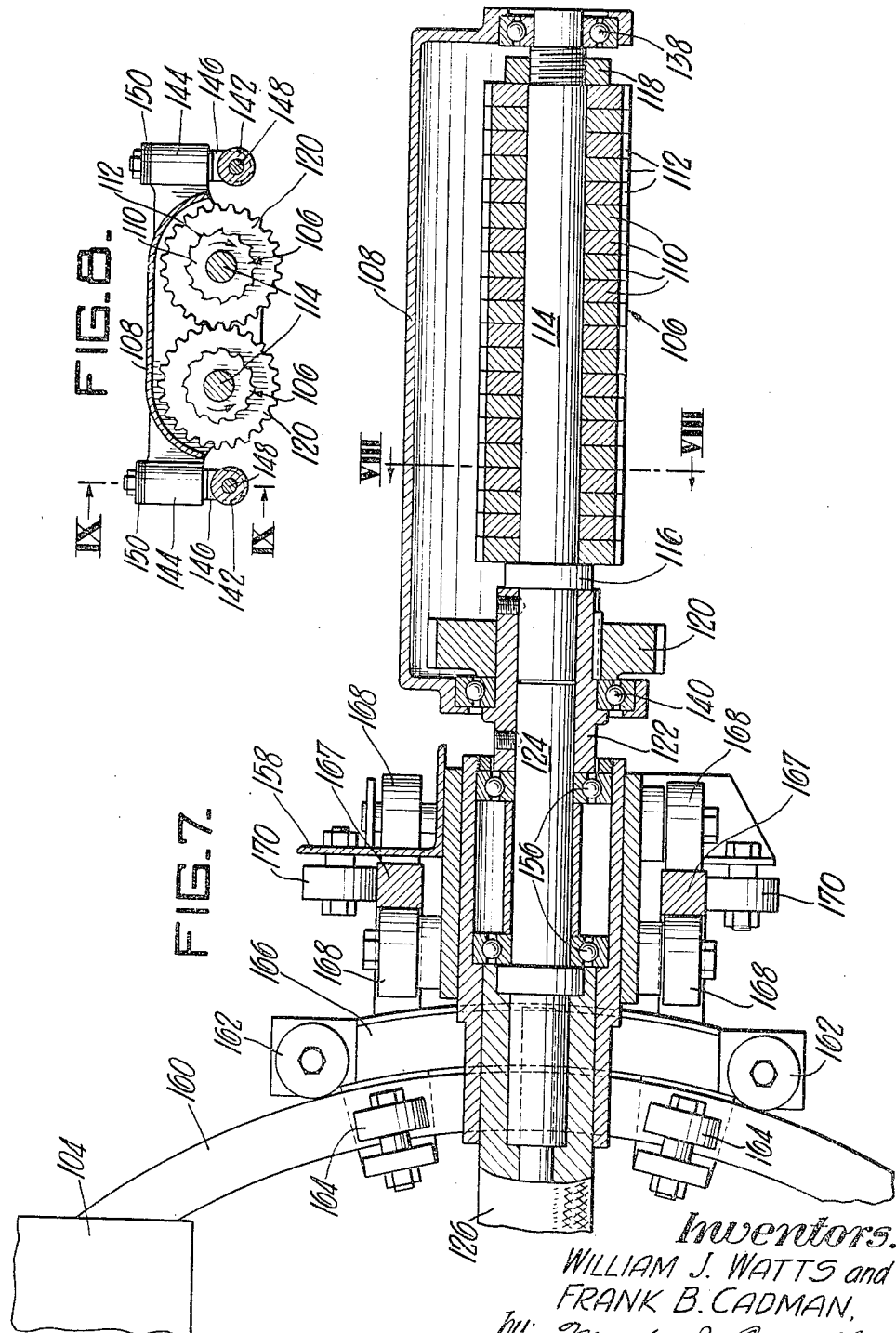

United States Patent Office 2,765,903
Patented Oct. 9, 1956

2,765,903
LOG FEEDING APPARATUS FOR A DEBARKING MACHINE

William J. Watts, Philipsburg, and Frank B. Cadman, Osceola Mills, Pa.; said Cadman assignor to said Watts Original application May 10, 1950, Serial No. 161,186. Divided and this application April 3, 1952, Serial No. 280,316

10 Claims. (Cl. 203—75)

This invention relates to log feeding apparatus for a debarking machine and is a division of our copending application, Serial No. 161,186, filed May 10, 1950, which has issued as Patent No. 2,596,187.

The logs to be debarked are ordinarily about five feet long and from three to twenty-four inches in diameter. Before they can be used as pulpwood, it is necessary that the bark be removed therefrom. This is ordinarily done by hand by means of a spud ax or draw knife during the summer months when the bark is relatively loose. Various machines have been developed for removing bark from the logs, but they have not proved to be efficient or practical so that at present most of the bark is removed by hand labor as described above. One difficulty encountered in removing the bark by machine is the presence of inequalities in the log which makes it impractical for the tool to follow the contour of the log. Knots in the log also cause difficulty. The inequalities also make it difficult to feed the logs.

It is an object of our invention to provide means for feeding various size logs under the cutters at variable speeds.

This and other objects will be more apparent after referring to the following specification and attached drawings, in which:

Figure 3 is a front elevation of the device of Figure 1;

Figure 4 is an enlarged front elevation of a portion of our device;

Figure 5 is an enlarged side elevation of the debarker;

Figure 6 is an enlarged rear elevation of the debarker;

Figure 7 is an enlarged sectional view of the cutter and cutter mounting taken on the line VII—VII of Figure 4;

Figure 8 is a sectional view taken on the line VIII—VIII of Figure 7; and

Figure 9 is an enlarged sectional view taken on the line IX—IX of Figure 8.

Figure 1:
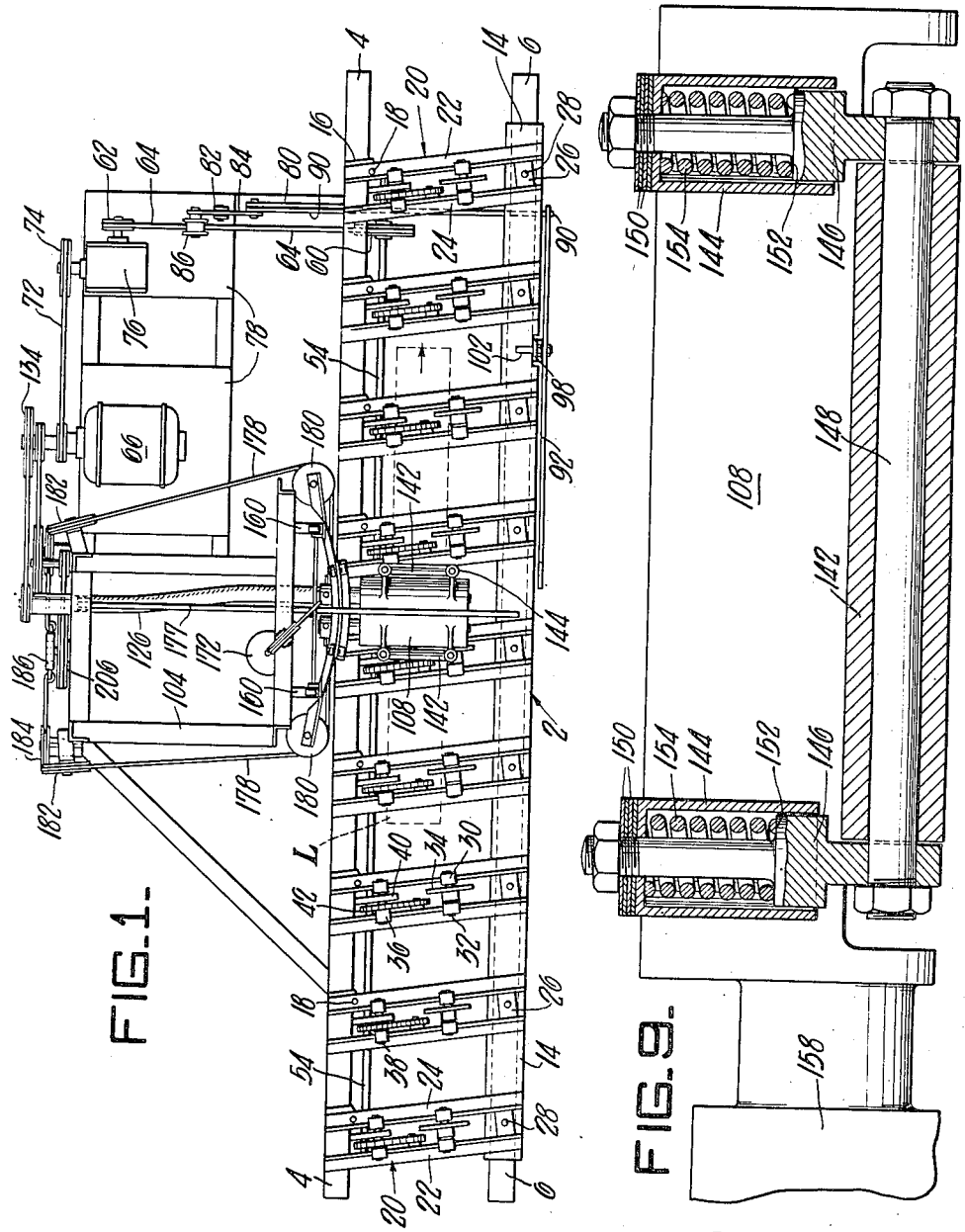
Figure 1 is a top plan view of our debarking device.

Referring more particularly to the drawings, the reference numeral 2 indicates a feed table for the logs L which are to be debarked. The feed table 2 includes two longitudinal angles 4 and 6 supported on vertical angles 8 spaced apart along the front and rear of the table. Corresponding front and rear angles 8 are connected by cross members 10. To insure stability, braces 12 may be used between the angles 8 and longitudinal angles 4 and 6 as best shown in Figure 3. The various parts of the feed table so far mentioned may be connected by means of bolts, rivets or by welding. A plate 14 is slidably mounted on the horizontal flange of angle 6. Welded to the top of the horizontal flange of angle 4 is a plurality of spaced apart plates 16. Extending upwardly from and fastened to each of plates 16 is a pin 18. A bracket 20 is pivotally mounted on each pin 18. Each of the brackets 20 is made up of two parallel angles 22 and 24 connected at one end by means of a plate 26. The plate 26 has a hole therein for receiving a pin 28 which is fastened to and extends upwardly from plate 14. A bearing 30 is mounted on each of angles 22 and 24 in any suitable manner. A shaft 32 passes through the bearings 30 and supports a rotatable roller or disc 34. In a similar manner bearings 36 are mounted on the angles 22 and 24 adjacent the pin 18 for rotatably receiving a shaft 38. Mounted on the shaft 38 for rotation therewith are a pulley 40 and sprocket 42. A smaller sprocket 44 is mounted in any suitable manner below the angle 24 in a bearing 46 supported by the angle 24. A chain 48 carrying teeth 50 extends between sprockets 42 and 44. A plate 52 of the same thickness as plate 16 is fastened beneath the rear end of the angle 24. A line shaft 54, supported by the table 2, extends below and parallel to the angle 4. A plurality of pulleys 56, one for each bracket 20 is mounted on shaft 54 for rotation therewith. As best shown in Figure 5, a belt 58 extends between each pair of pulleys 40 and 56. A drive pulley 60 is also fastened to the shaft 54 adjacent the right hand end thereof as shown in Figure 1. Pulley 60 is rotated from a pulley 62 by means of a belt 64. The pulley 62 is driven from a motor 66 through motor shaft 68, pulley 70, belt 72, pulley 74 and gear box 76. The motor 66 and gear box 76 are mounted on a platform 78. An angle 80 extends from one of the vertical angles 8 to the platform 78 and forms a support for the right end thereof. A bracket 82 is fastened to and extends upwardly from angle 80 and pivotally supports a lever 84. One end of the lever 84 supports a pulley 86 which bears on belt 64 while the other end is pivotally attached to a vertical link 88. The lower end of link 88 is pivotally attached to a link 90 which in turn is fastened to one end of a foot treadle 92. A bar 94 is suspended from the angle 6 and has a pivot bolt 96 at its lower end for supporting the foot treadle 92. A hand lever 98 is also pivotally attached to bar 94 by means of bolt 100 and engages in an oversize notch in the plate 14. A pin 102 is rigidly attached to lever 98 in spaced relationship with the upper surface of plate 14, when the lever 98 assumes a vertical position, so that swinging movement of said lever toward either end is limited by contact of said pin with said plate.

Figure 2:
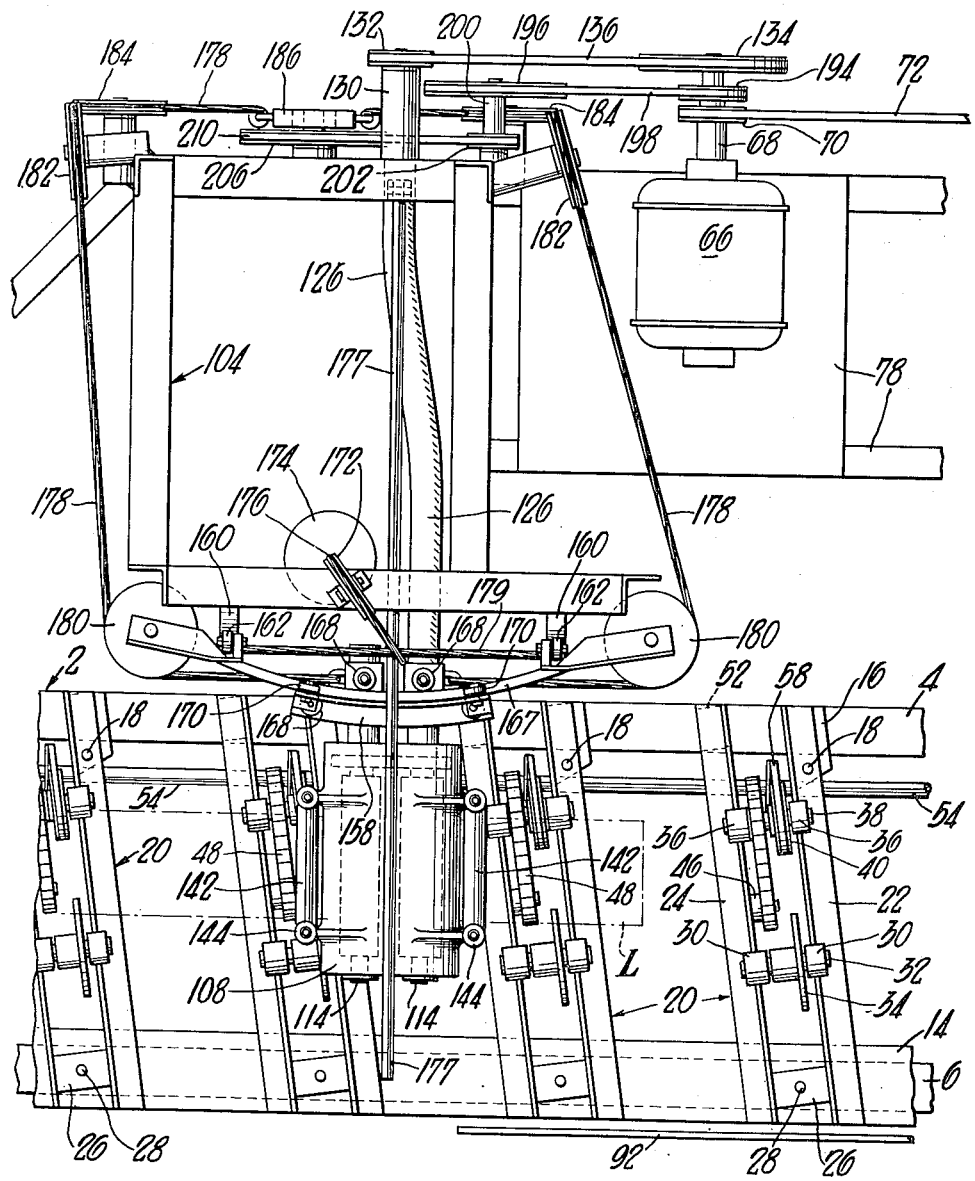
Figure 2 is an enlarged top plan view of a portion of the device of Figure 1.

A cutter support 104 is provided to the rear of feed table 2 intermediate the length thereof. As shown, the cutter support is fabricated from a plurality of angles welded together. A pair of cutters 106 is mounted in a housing 108 extending over the log L on the feed table 2. The cutters 106 are preferably of the type shown in the copending application of William J. Watts, Serial No. 611,329, filed August 18, 1945. As best shown in Figure 7, each cutter consists of a plurality of discs 110 having hooked teeth 112 around their periphery. The discs are mounted on a shaft 114 and held in place thereon between a shoulder 116 and a nut 118. A gear 120 is mounted on a sleeve 122 for rotation with shaft 114. One shaft 114 is connected to a drive shaft 124 by means of sleeve 122. The shaft 124 is in turn connected to a flexible shaft 126. The rear end of flexible shaft 126 is connected to one end of a shaft 128 mounted in a bearing 130 carried by the cutter support 104. As best shown in Figure 2, the other end of shaft 128 carries a pulley 132 which is driven from motor 66 by means of shaft 68, pulley 134 and belt 136. The other cutter 106 is driven by means of the gears 120 meshing with one another so that the cutters rotate in opposite directions. If desired, only one cutter may be provided, but two are preferred in order that the bark may be cut when the cutters are being moved in either direction. The housing 108 surrounds the top part of the cutters 106 and is supported thereby on bearings 138 and 140 as shown in Figure 7. On each side of the housing 108 is mounted a spring loaded roller 142 for limiting the depth of the cut and also for protecting the cutter teeth from damage due to too deep penetration into the log being debarked. For supporting each roller 142 a pair of cylinders 144 is fastened to the housing 108. A member 146 is slidably mounted in each cylinder 144. The lower ends of members 146 support a shaft 148 which carries a roller 142 while the upper end extends through the top of cylinder 144 and has a nut fastened thereto for limiting the downward movement of roller 142. Shims 150 may be provided for changing the amount of this movement. Each of the members 146 is provided with a shoulder 152 against which bears a spring 154 for urging the roller 142 downwardly.

The shaft 124 is mounted for rotation in ball bearings 156 which in turn are supported by a horizontally movable carriage 158. A pair of spaced apart curved vertical tracks 160 is mounted on the front of cutter support 104 for receiving rollers 162 and 164 of a vertically movable carriage 166. The rollers 164 act to keep the rollers 162 on the track 160. The carriage 166 has a pair of spaced apart curved horizontal tracks 167 thereon for receiving rollers 168 and 170 which are supported on the carriage 158. A pulley 172 is mounted on top of cutter support 104. A counterweight 174 is provided for carriage 166 and is attached to a wire rope 176 which passes over pulley 172. A rod 177 is fastened to the end of rope 176 and to wire rope 179, the ends of which are attached to the carriage 166. One end of rod 176 extends over the table 2 and the other end is pivotally mounted at 181 on the cutter support 104.

A wire rope 178 is fastened to each side of carriage 158 and passes therefrom over a pulley 180 rearwardly to a pulley 182, around the pulley 182 downwardly to a pulley 184 and around pulley 184 to a crank lever 186 which is pivoted at 188 on the rear side of cutter support 104. The various pulleys are mounted on the support 104. The crank lever 186 is provided with a slot 190 for receiving a slide 192. Mounted on shaft 68 is a pulley 194 which drives a pulley 196 by means of belt 198. The pulley 196 is mounted on the rear of support 104 by means of a shaft 200 which carries a second pulley 202. The slide 192 is carried by a pin 204 which is eccentrically mounted on a pulley 206. A shaft 208 is mounted on the rear side of support 104 for supporting the pulley 206. The pulley 206 is driven from pulley 202 by means of a belt 210.

The operation of the device is as follows:

A log L is cradled between the discs 34 and chains 48. While the chains 48 could be omitted they are definitely preferred since they enable logs of various diameters to be better accommodated. The motor 66 is started in operation and the operator steps on foot treadle 92 to force the pulley 86 against the belt 64, thus causing the drive shaft 54 to rotate. This, in turn, causes the chains 48 to revolve which causes the log L to rotate and feed axially in the direction of the arrow in Figure 1. If a greater rate of feed of the log is desired, the lever 98 is pushed to move to the right as seen in Figure 3. This moves the plate 14 to the right which is the direction in which the log is being fed. By moving the plate 14 to a position where the bracket 20 is at right angles to the plate no movement of the log takes place. If it is desired to feed the log in the reverse direction, the plate 14 is moved to the left as shown in Figure 1 until the brackets 20 face in the opposite direction to that shown. Rotation of motor 66 also causes the cutters 106 to revolve. At the same time the pulley 206 is rotated, thus causing the crank lever 186 to move rapidly back and forth around its pivot 188. This causes the cables 178 to rapidly reciprocate the carriage 158 in a horizontal plane. The operator then pulls down on the bar 177 to permit the weight of the carriage 166 to feed the cutters 106 down on the log L. Additional pressure may be applied by the operator pushing down on the carriage 166. The amount of pressure applied determines the penetration of the cutter teeth into the log. The rollers 142 bear on the log and as pressure is increased on the carriage 166, the members 146 rise against the pressure of springs 154, thus causing a greater portion of the teeth of the cutters 106 to be exposed. If the log has a knot or enlargement thereon, the carriage 166, after pressure thereon is removed, is free to be moved upwardly by the counterbalance 174 or by lifting up the bar 177. The rapid reciprocation of the cutters 106 enables the bark to be quickly removed from the log L as it rotates about its axis. One cutter operates on the log when moving in one direction and the other operates on the log when moving in the reverse direction. Operation of the device is possible with only one cutter, but in such a case the removal of the bark is not as rapid. If deemed desirable, clutches may be provided between the motor 66 and the flexible shaft 126 and also between the motor 66 and the pulley 206. In this manner these drives may be operated at will in the same manner that the pulley 86 connects and disconnects the drive of shaft 54.

While one embodiment of our invention has been shown and described it will be apparent that other adaptations and modifications may be made without departing from the scope of the following claims.

We claim:

1. Apparatus for feeding a log or the like axially comprising a base extending on both sides of said log, a plate slidably mounted on one side of said base for movement in a direction extending longitudinally of said base, a plurality of transverse brackets on said base spaced apart longitudinally of said base and extending from side to side thereof, means for fastening one end of each of said brackets to said slidable plate, means for pivotally mounting the other end of each of said brackets on said base on the side opposite said plate, a disc rotatably mounted on each bracket between said pivot and plate with its axis extending in a direction generally longitudinal of said base, a sprocket rotatably mounted on each of said brackets between said pivot and plate and spaced from said disc, said discs and sprockets having their axes substantially parallel, a second sprocket rotatably mounted on each of said brackets between said disc and said first sprocket, a chain having outwardly extending teeth thereon extending between the sprockets on each bracket, said discs and said chains being spaced apart to provide a cradle for said log, means for rotating said sprockets, and means for moving said plate to change the rate of feed of said log.

2. Apparatus for feeding a log or the like axially according to claim 1 in which each transverse bracket comprises a pair of spaced apart angles having one leg of each extending upwardly, and means for connecting said angles, said disc and sprockets being received in the space between said upwardly extending legs.

3. Apparatus for feeding a log or the like axially comprising a base extending on both sides of said log, a plate slidably mounted on one side of said base for movement in a direction extending longitudinally of said base, a plurality of transverse brackets on said base spaced apart longitudinally of said base and extending from side to side thereof, means for fastening one end of each of said brackets to said slidable plate, means for pivotally mounting the other end of each of said brackets on said base on the side opposite said plate, a disc rotatably mounted on each bracket between said pivot and plate with its axis extending in a direction generally longitudinal of said base, a sprocket rotatably mounted on each of said brackets between said pivot and plate and spaced from said disc, said discs and sprockets having their axes substantially parallel, means for rotating said sprockets, and means for moving said plate to change the rate of feed of said log.

4. Apparatus for feeding a log or the like axially according to claim 3 in which each transverse bracket comprises a pair of spaced apart angles having one leg of each extending upwardly, and means for connecting said angles, said disc and sprocket being received in the space between said upwardly extending legs.

5. Apparatus for feeding a log or the like axially comprising a base extending on both sides of said log, a plurality of transverse brackets on said base spaced apart longitudinally of said base and extending from side to side thereof, means mounting one end of each of said brackets on one side of said base, means mounting the other end of each of said brackets on the other side of said base, a disc rotatably mounted on each bracket intermediate the sides of said base with its axis extending in a direction generally longitudinal of said base, a sprocket rotatably mounted on each of said brackets intermediate the sides of said base and spaced from said disc, said discs and sprockets having their axes substantially parallel, a second sprocket rotatably mounted on each of said brackets between said disc and said first sprocket, a chain having outwardly extending teeth thereon extending between the sprockets on each bracket and supported solely by said sprockets, said discs and said chains being spaced apart to provide a cradle for said log, and means for rotating said sprockets.

6. Apparatus for feeding a log or the like axially according to claim 5 in which each transverse bracket comprises a pair of spaced apart angles having one leg of each extending upwardly, and means for connecting said angles, said disc and sprockets being received in the space between said upwardly exending legs.

7. Apparatus for feeding a log or the like axially comprising a base extending on both sides of said log, a plate slidably mounted on one side of said base for movement in a direction extending longitudinally of said base, a plurality of transverse brackets on said base spaced apart longitudinally of said base and extending from side to side thereof, means for fastening one end of each of said brackets to said slidable plate, means for pivotally mounting the other end of each of said brackets on said base on the side opposite said plate, a disc rotatably mounted on each bracket between said pivot and plate with its axis extending in a direction generally longitudinal of said base, a sprocket rotatably mounted on each of said brackets between said pivot and plate and spaced from said disc, said discs and sprockets having their axes substantially parallel, the top of said discs and sprockets being above the top of said brackets, a second sprocket rotatably mounted on each of said brackets between said disc and first sprocket with its top substantially below the tops of the first sprocket and disc, a chain having outwardly extending teeth thereon extending between the sprockets on each bracket and supported solely by said sprockets, said discs and said chains being spaced apart to provide a cradle for said log, means for rotating said sprockets, and means for moving said plate to change the rate of feed of said log.

8. Apparatus for feeding a log or the like axially according to claim 7 in which each transverse bracket comprises a pair of spaced apart angles having one leg of each extending upwardly, and means for connecting said angles, said disc and sprockets being received in the space between said upwardly extending legs.

9. Apparatus for feeding a log or the like axially comprising a base extending on both sides of said log, a plurality of transverse brackets on said base spaced apart longitudinally of said base and extending from side to side thereof, means mounting one end of each of said brackets on one side of said base, means mounting the other end of each of said brackets on the other side of said base, a disc rotatably mounted on each bracket intermediate the sides of said base with its axis extending in a direction generally longitudinal of said base, a sprocket rotatably mounted on each of said brackets intermediate the sides of said base and spaced from said disc, said discs and sprockets having their axes substantially parallel, the top of said discs and sprockets being above the top of said brackets, a second sprocket rotatably mounted on each of said brackets between said disc and first sprocket with its top substantially below the tops of the first sprocket and disc, a chain having outwardly extending teeth thereon extending between the sprockets on each bracket and supported solely by said sprockets, said discs and said chains being spaced apart to provide a cradle for said log, and means for rotating said sprockets.

10. Apparatus for feeding a log or the like axially according to claim 9 in which each transverse bracket comprises a pair of spaced apart angles having one leg of each extending upwardly, and means for connecting said angles, said disc and sprockets being received in the space between said upwardly extending legs.

References Cited in the file of this patent

UNITED STATES PATENTS

| 737,646 | Moreau | Sept. 1, 1903 |
| 1,294,275 | Johnson et al. | Feb. 11, 1919 |
| 1,712,376 | Burkhardt | May 7, 1929 |
| 2,038,204 | Bidle | Apr. 21, 1936 |
| 2,198,178 | Postlewaite | Apr. 23, 1940 |
| 2,583,764 | Buckholdt | Jan. 29, 1952 |